United States Patent [19]

Szush, Jr.

[11] 4,151,767

[45] May 1, 1979

[54] PIPE CENTER ASSEMBLY

[76] Inventor: John J. Szush, Jr., 659 Hickory Ave., Harahan, La. 70123

[21] Appl. No.: 866,655

[22] Filed: Jan. 3, 1978

[51] Int. Cl.² .................... B23B 23/02; B23B 25/00
[52] U.S. Cl. .................................. 82/33 R; 82/38 R
[58] Field of Search ............. 82/33, 43, 44, 45, 33 A, 82/38 R

[56] References Cited

U.S. PATENT DOCUMENTS

| 436,223 | 9/1890 | Evely | 82/44 |
| 1,479,952 | 1/1924 | Boyce | 82/33 |
| 3,213,724 | 10/1965 | McMurtrie | 82/45 |

FOREIGN PATENT DOCUMENTS

| 659098 | 3/1963 | Canada | 82/33 |
| 952746 | 8/1974 | Canada | 82/33 |

*Primary Examiner*—Harrison L. Hinson
*Attorney, Agent, or Firm*—John F. Sieberth

[57] ABSTRACT

The assembly described comprises a shaft mountable in the tailstock and upon the forward portion of which is rotatably supported a hub. One of a plurality of interchangeable frustoconically shaped work centering support members which differ from each other in external diameter and which are individually frictionally supportable on the hub to accommodate variously sized hollow workpieces is mounted on the hub. The assembly is lighter in weight and has better service characteristics than prior art devices.

14 Claims, 8 Drawing Figures

PIPE CENTER ASSEMBLY

This invention relates to assemblies for supporting hollow workpieces on the tailstock of lathes.

When working pipestock and other workpieces having hollow interiors it is common practice to employ a pipe center for supporting the workpiece on the tailstock of the lathe. To facilitate rotation of the workpiece and reduce wear and tear of equipment, pipe centers having live heads which rotate with the workpiece have been utilized for this purpose. U.S. Pat. Nos. 1,878,690 to Forney, 2,313,963 to Patrick and 2,501,684 to Landreth are illustrative of some of the developments along these lines.

While improvements have been made in pipe center design, several shortcomings are still encountered, especially when using live pipe centers with workpieces having hollow interiors which substantially differ from each other in diameter. In the first place, live pipe centers for supporting relatively large sized workpieces are heavy. For example, one typical bullnose live center currently available in the marketplace having a head 7.87 inches in diameter weighs 44.1 pounds, and larger sized centers weigh considerably more than this. Thus to install or to remove such heavy duty items is neither an easy nor a safe operation. In addition, installation and removal of such heavy equipment can stress and cause damage of critical parts, such as bearings.

Since conically-shaped heads of conventional live centers accommodate hollow workpieces of different diameters at different positions along their lengths, the force of the machining is oftentimes received by the center at a locus relatively remote from its internal bearings. Exposure to such usage can result in excessive bearing wear and necessitate rebuilding or replacement of the center more frequently than desired.

Another difficulty encountered when using conventional live centers arises when the head of the center is large relative to the workpiece being supported thereon. In such a case the head itself can become an obstacle to machining the end of the workpiece nearest the tailstock.

This invention provides an assembly which overcomes most, if not all of the foregoing difficulties in a straight-forward and economical manner.

In accordance with this invention there is provided a live pipe center assembly for supporting a workpiece on a tailstock of a machine, which assembly comprises (a) a shaft having forward and rearward portions, the rearward portion being adapted to be mounted in the tailstock;
(b) a hub having (i) an exterior supporting surface, (ii) a rearward end portion provided with a forwardly axially extending recess and (iii) outwardly extending flange means disposed to the rear of said supporting surface;
(c) bearing means disposed around the forward portion of said shaft and within the recess of said hub rotatably supporting said hub on said shaft;
(d) a hollow work centering support member having frictional supported engagement on the supporting surface of said hub; and
(e) means on said flange means for disengaging said member from said hub.

This invention also involves, inter alia, the provision of a plurality of interchangeable frustoconically shaped work centering support members which differ from each other in external diameter and which are individually frictionally supportable on the hub to accommodate variously-sized hollow workpieces. Set up time is short inasmuch as the substitution of one work centering member for another can be done quickly and easily, removal of the frictionally mounted support member being facilitated by the disengaging means carried by the flange means on the hub. In preferred form, the disengaging means comprise a plurality of jack bolts or like machine screw means passing through respective correspondingly threaded axially extending apertures peripherally positioned around the hub, whereby the jack bolts can be caused on rotation to abut the rearward portion of the work centering member and force it to move in a forward direction away from the flange means. Use of this type of disengaging means is advantageous in that it eliminates the possibility of the system sustaining the damage which might otherwise result if hammers, crowbars, or other like instruments were used to dislodge the frictionally mounted support members from the hub by hammering or prying.

Although other arrangements are possible, the exterior supporting surface of the hub is preferably a forwardly inwardly tapered surface, with each hollow work centering support member having a correspondingly tapered interior surface for establishing the frictionally supported engagement between the member and the hub. This arrangement facilitates both the mounting of the support member on the hub and its removal from the hub and thus further contributes to reduced set up time and reduced likelihood of parts being damaged during set up.

Preferably the work support member has a tapered annular exterior surface for engaging and supporting a hollow cylindrical workpiece thereon. Such forward inward taper insures that the connection between the workpiece and the support is tight and secure, and enables a given support member to accommodate different workpieces having similar but different interior diameters.

In another of its forms this invention provides a live pipe center assembly for supporting a workpiece on a tailstock of a machine, which assembly comprises (a) a shaft having forward and rearward portions, the rearward portion being adapted to be mounted in the tailstock;
(b) a hub having a forwardly inwardly tapered exterior supporting surface and a rearward end portion provided with a forwardly axially extending recess;
(c) bearing means disposed around the forward portion of said shaft and within the recess of said hub rotatably supporting said hub on said shaft; and
(d) a plurality of annular work centering support members each having (i) an interior tapered surface corresponding to the tapered exterior supporting surface of said hub so as to be interchangeably frictionally supported on said hub and (ii) a forwardly inwardly tapered annular exterior surface for engaging and supporting a hollow cylindrical workpiece thereon, said members having different respective outer diameters so that they may be interchanged with each other on said hub to furnish support for hollow workpieces of different respective inner diameters; the slope of the forwardly inwardly tapered supporting surface of said hub being less than the slopes of the forwardly inwardly tapered annular exterior surfaces of said respective work centering support members.

The interchangeability feature of this invention enables rotatable support of hollow workpieces differing considerably in size while at the same time confining the area at which the machining force is received by the live center to a zone over the bearings within the hub. In other words, in the preferred embodiments of this invention the locus of the frictional supported engagement between the work support member and the hub and the locus of rotatable support between the hub and the shaft afforded by the bearing means occur along an essentially coextensive coaxial zone.

Another advantageous feature of this invention is that the interchangeability is achieved without need for carrying or hoisting heavy massive parts. Instead annular or hoop-shaped work support members of lighter weight are substituted one for another on the sub-assembly of the hub, bearings and shaft, which remains mounted in the tailstock. Thus the installation and removal operations are much earier, safer and involve much less likelihood of encountering stresses causing damage to the bearings or the like.

Since in the assemblies of this invention the work centering support member is not large relative to the workpiece being supported thereon, the support member does not constitute an obstacle to machining the end of the workpiece nearest the tailstock. By virtue of this invention economies can be realized because only one rotatable hub sub-assembly is required for use with any of a variety of work support members of differing external sizes.

In accordance with preferred embodiments of this invention the bearing means of the assembly include load bearing means and thrust bearing means. In this way, forces applied to the tapered annular exterior surface of the preferred work centering support members during machining of the workpiece are received in part by the load bearings and in part by the thrust bearings. This in turn results in the assembly having a longer effective service life. In order to accommodate the load bearings and the thrust bearings the shaft of the assembly of this invention most preferably has a plurality of axially positioned stepped cylindrical segments, each of which accommodates a bearing. Most preferably, at least two such bearings are load bearings and at least one of the bearings is a thrust bearing axially interposed between the load bearings.

These and additional features, advantages, characteristics and embodiments of this invention will be apparent from the ensuing description, appended claims and drawings in which:

Figure 1:
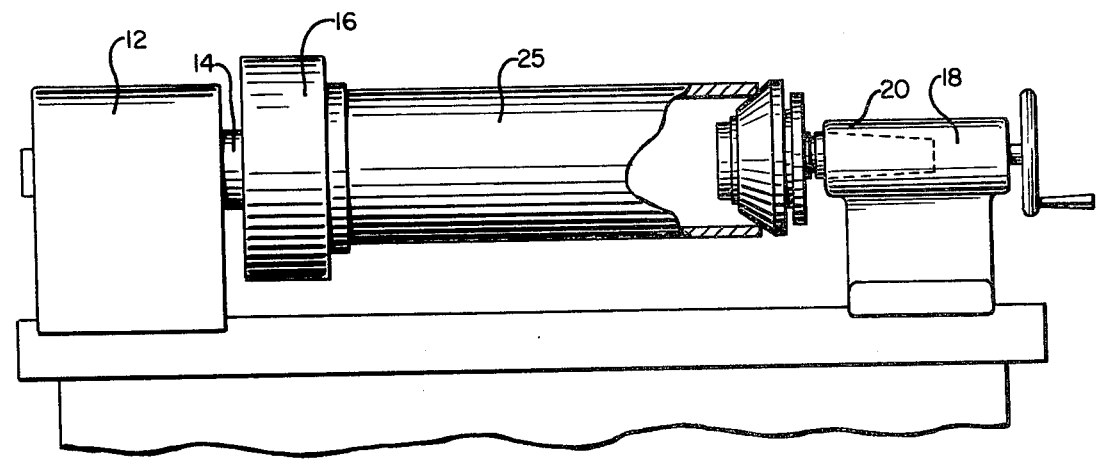
FIG. 1 is a side elevational view, partly broken away, of a lathe utilizing an assembly of this invention.

Referring to the drawings, this invention is adapted for use with a lathe structure 10 including a headstock 12 having an output shaft 14 for driving a chuck 16. The lathe has a tailstock 18 adjustable longitudinally along the lathe and provided with a tapered socket 20 for receiving a tapered shaft or arbor.

In the form depicted the assembly of this invention includes a shaft 30, a hub 50 rotatably mounted thereon, and a work centering support member 70 frictionally mounted on the hub. The rearward portion 32 of shaft 30 is tapered and sized to be received and held firmly in socket 20.

Figure 2:
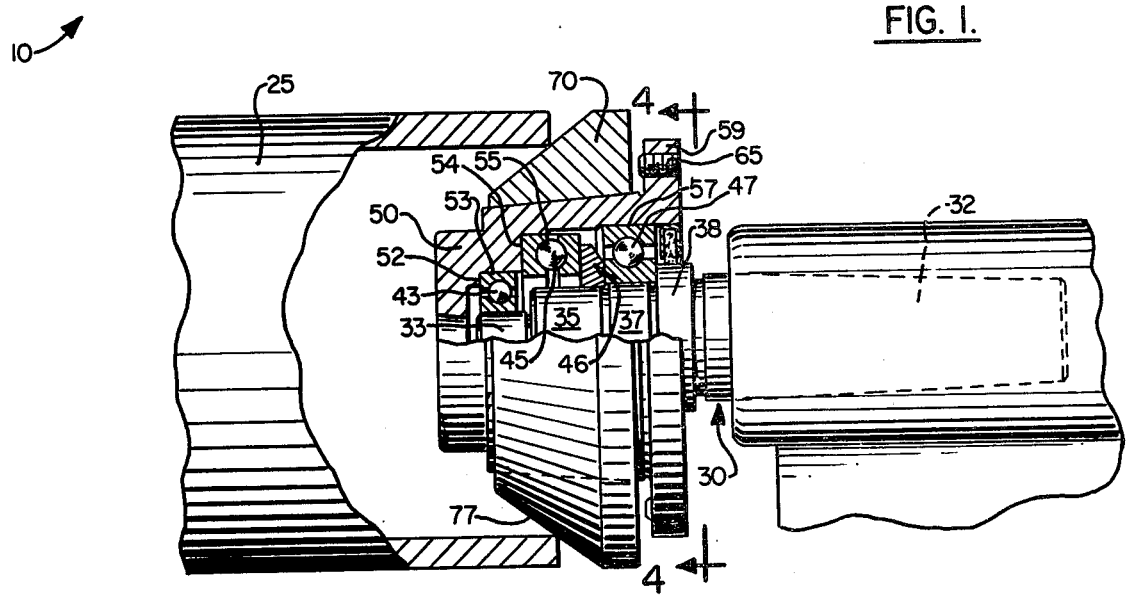
FIG. 2 is a fragmentary side elevational view, partly broken away and in section, of an assembly of this invention mounted in the tailstock and rotatably supporting a hollow cylindrical workpiece.

As best seen in FIG. 2, shaft 30 at its forward portion has a series of cylindrical segments 33, 35, 37 and a rim 38. Segment 33 accommodates front load bearing 43, segment 37 accommodates rear load bearing 47, and the intermediate segment 35 accommodates thrust bearing 45 and spacer 46. In the system depicted, the internal diameter of thrust bearing 45 is somewhat larger than the diameter of segment 35, the rear portion of bearing 45 abuts the forward edge of spacer 46, spacer 46 has its back edge beveled so that it abuts only the inner forward edge of load bearing 47, and the inner rear edge of load bearing 47 abuts the frontal face of rim 38.

With continued reference to the form of the invention depicted in FIG. 2, hub 50 has a stepped hollow interior with a series of stepped cylindrical segments 53, 55, 57 sized and spaced to accommodate bearings 43, 45, and 47, respectively. Hub 50 also has an annular shoulder 52 positioned so as to abut only the outer forward edge of load bearing 43, and an annular shoulder 54 positioned so as to abut the front portion of thrust bearing 45. Hub 50 is thus rotatably secured to shaft 30 by means of the front and rear load bearings 43 and 47.

Figure 3:
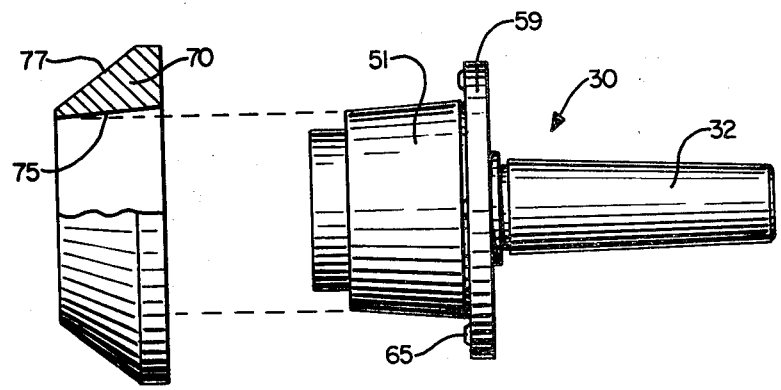
FIG. 3 is a side elevational view of an assembly of this invention in which a work support member, partly broken away and in section, is depicted axially aligned with but separated from the hub sub-assembly.
Figure 5:
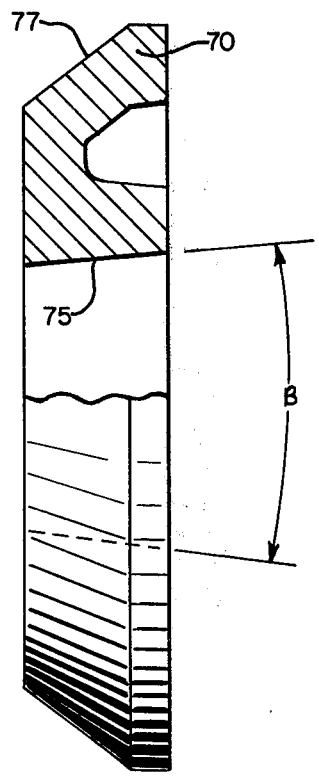
FIGS. 5, 6 and 7 are side views in section of a plurality of hollow working centering support members of this invention suitable for interchangeable use on the hub sub-assembly such as depicted in FIG. 3.

The outer portion of hub 50 includes both a forwardly inwardly tapered exterior surface 51 radially positioned relative to bearings 43, 45, and 47, and outwardly extending flange means 59 positioned to the rear of surface 51. Surface 51 serves as the frictional mounting place for the work centering support member 70 having the external diameter and configuration for the work at hand. As shown particularly by FIG. 3 the inner annular surface 75 of support member 70 is tapered so that it corresponds and matches with the taper of surface 51. Accordingly, when surfaces 51 and 75 are in registration with each other (note FIG. 2) member 70 is frictionally supported or mounted on hub 50 whereby hub 50 and member 70 are free to rotate in unison. As indicated in FIG. 5, it is preferred to provide a plurality of members 70 of different external diameters, the bores of such members being of the same size and taper so that the members can be interchanged with each other on hub 50 to furnish rotatable support for variously sized workpieces having hollow interiors.

Figure 6:
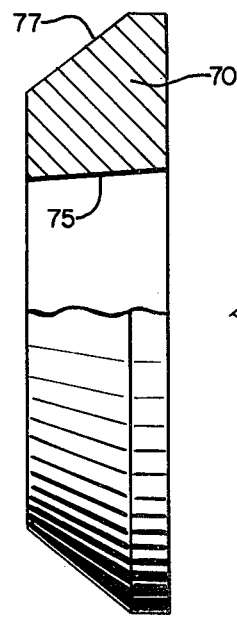
Figure 7:
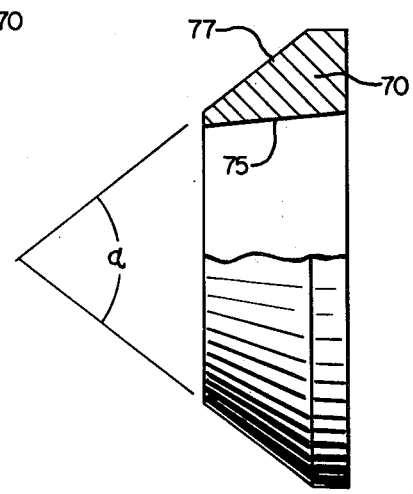

The exterior annular surface 77 of member 70 is forwardly inwardly tapered and serves as the supporting surface for the adjacent end of the workpiece 25. In most cases the slope of surface 77 will exceed the slope of surface 75 (and, accordingly, the slope of surface 51 as well). However, it is possible to have the slope of surface 77 the same as or even less than the slope of surface 75 although such arrangements are less desirable. For best results the forward slope of surface 77 is such that the workholding angle $\alpha$ is in the range of from 60 to 90 degrees and the forward slope of surface 51 is such that the seating angle $\beta$ is in the range of from 5 to 15 degrees. In FIGS. 5, 6 and 7 $\alpha$ is about 75 degrees and $\beta$ is about 10 degrees.

Figure 4:
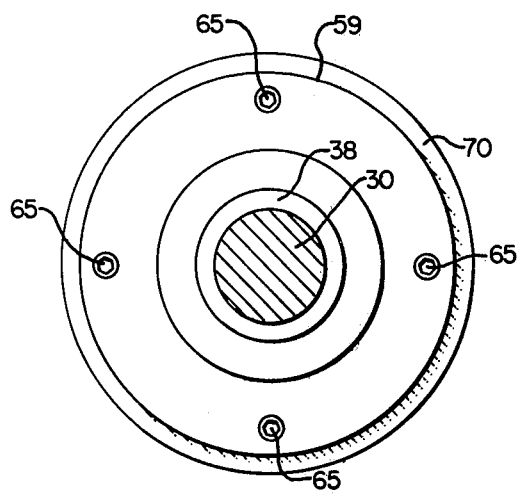
FIG. 4 is a transverse view, partly in section, taken along line 4, 4 of FIG. 2.
Figure 4A:
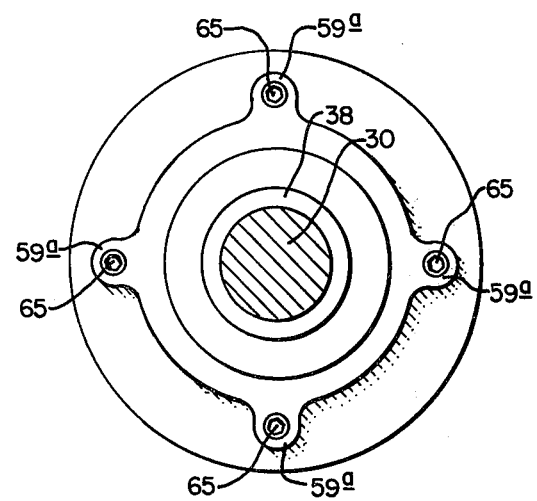
FIG. 4A is a view similar to FIG. 4 but illustrating a different form of outwardly extending flange means.

In FIG. 4 flange means 59 is in the form of a continuous flange to the rear and extending outwardly around the entire periphery of surface 51 whereas in the form depicted in FIG. 4A the flange means is in the form of four lobes 59a to the rear and radially projecting at 90 degree intervals beyond the perimeter of surface 51. In each case the flange means carries a plurality of jack bolts 65 in their corresponding axially aligned threaded apertures. As can be seen most readily from FIG. 2, jack bolts 65 and their corresponding apertures are positioned so that upon rotation of bolts 65 their forward ends can be caused to abut the rearward edge of mounted member 70 and dislodge it from its frictionally supported engagement with hub 50 when it is desired to substitute a given member 70 for another.

It can thus be seen that in the embodiment depicted in the drawings, workpiece 25 rotates in unison with member 70, hub 50 and bearings 43, 45, 47, bearings 43 and 47 being internally frictionally secured on the forward portion of shaft 30. Shaft 30 in turn is securely mounted in static position in socket 20. The taper on the exterior surface 77 of member 70 enables workpiece 25 to be centered and securely held in proper alignment as it is rotated by the driving means (not shown) in headstock 12. Forces imposed upon workpiece 25 during machining are transmitted to headstock 12 and tailstock 18, and to the extent transmitted to the tailstock are transmitted axially and radially to shaft 30 mounted in socket 20 of the tailstock. The axial forces are transmitted via member 70, hub 50, shoulder 54, thrust bearing 45, spacer 46, the inner portion of bearing 47, and thence to the frontal face of rim 38 of shaft 30. The radial forces are transmitted via member 70, hub 50, and thence to shaft 30 by means of segment 53, front load bearing 43 and segment 33, and also by means of segment 57, rear load bearing 47 and segment 37.

Since these forces are all transmitted from workpiece 25 to member 70 and hub 50 directly over the bearings adverse leverage effects, such as are encountered when the workpiece is seated on the forward end of a conically shaped live center forwardly of the bearings or when the workpiece is held by a chuck axially positioned forwardly of the bearings in a live head on which the chuck is frictionally seated, are not encountered. Thus in the assembly of this invention not only is the workpiece securely held in place as it rotates with the live center but excessive wear and premature failure of bearings and related parts due to such leverage effects are eliminated.

As can be seen from FIGS. 1 and 2, member 70 can be sized so as to present no obstacle whatever to machining workpiece 25 even at its proximate end. This is not possible when a chuck is employed, and is often difficult if not impossible where the size of a conical or bullnosed live center is large relative to the workpiece supported thereon.

It will be understood that certain features and subcombinations referred to herein are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A live pipe center assembly for supporting a workpiece on a tailstock of a machine, which assembly comprises
   (a) a shaft having forward and rearward portions, the rearward portion being adapted to be mounted in the tailstock;
   (b) a hub having (i) an exterior supporting surface, (ii) a rearward end portion provided with a forwardly axially extending recess and (iii) outwardly extending flange means disposed to the rear of said supporting surface;
   (c) bearing means disposed around the forward portion of said shaft and within the recess of said hub rotatably supporting said hub on said shaft;
   (d) a hollow work centering support member having frictional supported engagement on the supporting surface of said hub; and
   (e) means on said flange means for disengaging said member from said hub;

said assembly being further characterized in that the locus of the frictional supported engagement between said member and said hub is confined to the locus of rotatable support between said hub and said shaft afforded by said bearing means along an essentially coextensive coaxial zone whereby the forces transmitted from the workpiece to the assembly are transmitted over and around said bearing means within said coaxial zone.

2. An assembly in accordance with claim 1 wherein the exterior supporting surface of said hub is a forwardly inwardly tapered surface and said member has a correspondingly tapered interior surface for establishing the frictional supported engagement between said member and said hub.

3. An assembly in accordance with claim 1 wherein said member has a tapered annular exterior surface for engaging and supporting a hollow cylindrical workpiece thereon.

4. An assembly in accordance with claim 1 wherein said bearing means include load bearing means and thrust bearing means.

5. An assembly in accordance with claim 1 wherein the forward portion of said shaft has a plurality of axially positioned stepped cylindrical segments each of which accommodates a bearing, at least two of said bearings being load bearings and at least one of said bearings being a thrust bearing axially interposed between load bearings.

6. An assembly in accordance with claim 1 (i) wherein the exterior supporting surface of said hub is a forwardly inwardly tapered surface and said member has a correspondingly tapered interior surface for establishing the frictional supported engagement between said member and said hub; (ii) wherein said member has a forwardly inwardly tapered annular exterior surface for engaging and supporting a hollow cylindrical workpiece thereon; and (iii) wherein the slope of the forwardly inwardly tapered supporting surface of said hub is less than the slope of the forwardly inwardly tapered annular exterior surface of said member.

7. An assembly in accordance with claim 1 wherein the exterior supporting surface of said hub is tapered and wherein the assembly comprises one of a plurality of said members, each member of said plurality of members (i) having a correspondingly tapered interior surface for establishing the frictional supported engagement between said member and said hub and (ii) having a tapered annular exterior surface for engaging and supporting a hollow cylindrical workpiece thereon, said members having different respective outer diameters so that they may be interchanged with each other on said hub to furnish support for hollow workpieces of different respective inner diameters.

8. An assembly in accordance with claim 1 wherein the means on said flange means for disengaging said member from said hub comprise a plurality of machine screw means passing through respective correspondingly threaded axially extending apertures peripherally positioned around said hub, whereby said screws can be caused on rotation to abut the rearward portion of said member and force said member to move in a forward direction away from said flange means.

9. A live pipe center assembly for supporting a workpiece on a tailstock of a machine, which assembly comprises
(a) a shaft having forward and rearward portions, the rearward portion being adapted to be mounted in the tailstock;
(b) a hub having a forwardly inwardly tapered exterior supporting surface and a rearward end portion provided with a forwardly axially extending recess;
(c) bearing means disposed around the forward portion of said shaft and within the recess of said hub rotatably supporting said hub on said shaft; and
(d) one of a plurality of annular work centering support members, each member of said plurality of members being open at both ends and having (i) an interior tapered surface corresponding to the tapered exterior supporting surface of said hub so as to be interchangeably frictionally supported on said hub and (ii) a forwardly inwardly tapered annular exterior surface for engaging and supporting a hollow cylindrical workpiece thereon, said members having different respective outer diameters so that they may be interchanged with each other on said hub to furnish support for hollow workpieces of different respective inner diameters; the slope of the forwardly inwardly tapered supporting surface of said hub being less than the slopes of the forwardly inwardly tapered annular exterior surfaces of said respective work centering support members;

said assembly being further characterized in that the locus of the frictional supported engagement between said member and said hub is confined to the locus of rotatable support between said hub and said shaft afforded by said bearing means along an essentially coextensive coaxial zone whereby the forces transmitted from the workpiece to the assembly are transmitted over and around said being means within said coaxial zone.

10. An assembly in accordance with claim 9 (i) wherein the forward portion of said shaft has a plurality of axially positioned stepped cylindrical segments each of which accommodates a bearing, at least two of said bearings being load bearings and at least one of said bearings being a thrust bearing axially interposed between load bearings; and (ii) wherein said hub further includes an outwardly extending flange circumferentially disposed to the rear of said exterior supporting surface of said hub, said flange carrying a plurality of machine screws passing through respective correspondingly threaded axially extending apertures peripherally positioned around said hub, whereby said screws can be caused on rotation to abut the rearward portion of said member when frictionally supported on said hub and force said member to move in a forward direction away from the flange.

11. An assembly in accordance with claim 9 wherein said bearing means include load bearing means and thrust bearing means.

12. An assembly in accordance with claim 9 wherein the forward portion of said shaft has a plurality of axially positioned stepped cylindrical segments each of which accommodates a bearing, at least two of said bearings being load bearings and at least one of said bearings being a thrust bearing axially interposed between load bearings.

13. An assembly in accordance with claim 9 wherein said hub further includes outwardly extending flange means disposed to the rear of said exterior supporting surface of said hub, said flange means including means for disengaging said members from said hub.

14. An assembly in accordance with claim 9 wherein said hub further includes an outwardly extending flange circumferentially disposed to the rear of said exterior supporting surface of said hub, said flange carrying a plurality of machine screws passing through respective correspondingly threaded axially extending apertures peripherally positioned around said hub, whereby said screws can be caused on rotation to abut the rearward portion of said member when frictionally supported on said hub and force said member to move in a forward direction away from the flange.

* * * * *